United States Patent
Wada et al.

(10) Patent No.: US 7,343,063 B2
(45) Date of Patent: Mar. 11, 2008

(54) LIGHT SIGNAL SWITCHING APPARATUS

(75) Inventors: Morio Wada, Tokyo (JP); Shinji Iio, Tokyo (JP); Masayuki Suehiro, Tokyo (JP); Shinichi Nakajima, Tokyo (JP); Yoshiyuki Asano, Tokyo (JP); Tsuyoshi Yakihara, Tokyo (JP); Akira Miura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 188 days.

(21) Appl. No.: 11/175,160

(22) Filed: Jul. 7, 2005

(65) Prior Publication Data

US 2006/0013105 A1    Jan. 19, 2006

(30) Foreign Application Priority Data

Jul. 8, 2004    (JP)    ............ P. 2004-201224

(51) Int. Cl.
G02B 6/126    (2006.01)
G02B 6/27     (2006.01)
G02B 6/35     (2006.01)

(52) U.S. Cl. ............... 385/16; 385/11; 385/17
(58) Field of Classification Search ........ 385/11, 385/16–24

See application file for complete search history.

(56) References Cited

U.S. PATENT DOCUMENTS 6,915,031 B2 *    7/2005  Maki et al. ............ 385/16
2004/0247227 A1 * 12/2004 Eder et al. .............. 385/11

OTHER PUBLICATIONS

Baojun Li, et al., "1.55 μm Reflection-Type Optical Waveguide Switch Based on SiGe/Si Plasma Dispersion Effect", Applied Physics Letters, vol. 75, No. 1, Jul. 1999, pp. 1-3.
Baojun Li, et al., "2×2 Optical Waveguide Switch With Bow-Tie Electrode Based on Carrier-Injection Total Internal Reflection in SiGe Alloy", IEEE Photonics Technology Letters, vol. 13, No. 3, Mar. 2001, pp. 206-208.
Hiroaki Inoue, et al., "An 8 mm Length Nonblocking 4×4 Optical Switch Array", IEEE Journal on Selected Areas in Communications, vol. 6, No. 7, Aug. 1988, pp. 1262-1265.
K. Ishida, et al., "InGaAsP/InP Optical Switches Using Carrier Induced Refractive Index Change", Applied Physics Letters, vol. 50, No. 19, Jan. 1987, pp. 141-142.
"Optical Integrated Circuit -Fundamentals and Applications-", Japan Society of Applied Physics, First Edition, Chapter 5, Apr. 10, 1988, 5 pages.

* cited by examiner

Primary Examiner—Michelle R. Connelly-Cushwa
(74) Attorney, Agent, or Firm—Sughrue Mion, PLLC

(57) ABSTRACT

A light signal switching apparatus has an input port and output ports, and outputs an output light from a desired output port. The apparatus has a splitter polarizing an input light into first and second polarized light whose polarization planes are different mutually by 90 degrees, a first polarization controller rotating a polarization plane of the second polarized light by 90 degrees to output a third polarized light, a first optical switch switching a path of the first polarized light to the desired output port side, a second optical switch switching a path of the third polarized light to the desired output port side, a second polarization controller rotating a polarization plane of the first polarized light by 90 degrees to output a fourth polarized light, and a combiner combining the third polarized light with the fourth polarized light, to output a combined light to the desired output port.

22 Claims, 9 Drawing Sheets

LIGHT SIGNAL SWITCHING APPARATUS

CROSS-REFERENCE TO RELATED APPLICATIONS

This application is based upon and claims the benefit of priority from the prior Japanese Patent Applications No. 2004-201224, filed on Jul. 8, 2004, the entire contents of which are incorporated herein by reference.

BACKGROUND OF THE INVENTION

1. Field of the Invention

The present invention relates to a light signal switching apparatus that has a carrier-injected optical waveguide type optical switch used in the optical communication system or the measuring apparatus for the optical communication therein and switches the light signal at a high speed and more particularly, a light signal switching apparatus capable of reducing the polarization dependency.

2. Description of the Related Art

In the related art, the optical switch element serving as the 2-input/2-output optical switch, which changes the refractive index by injecting the current (carriers) into the current injection region provided to the semiconductor optical waveguide structure, was manufactured. Such optical switch element is called the carrier-injected optical waveguide type optical switch.

Figure 5:
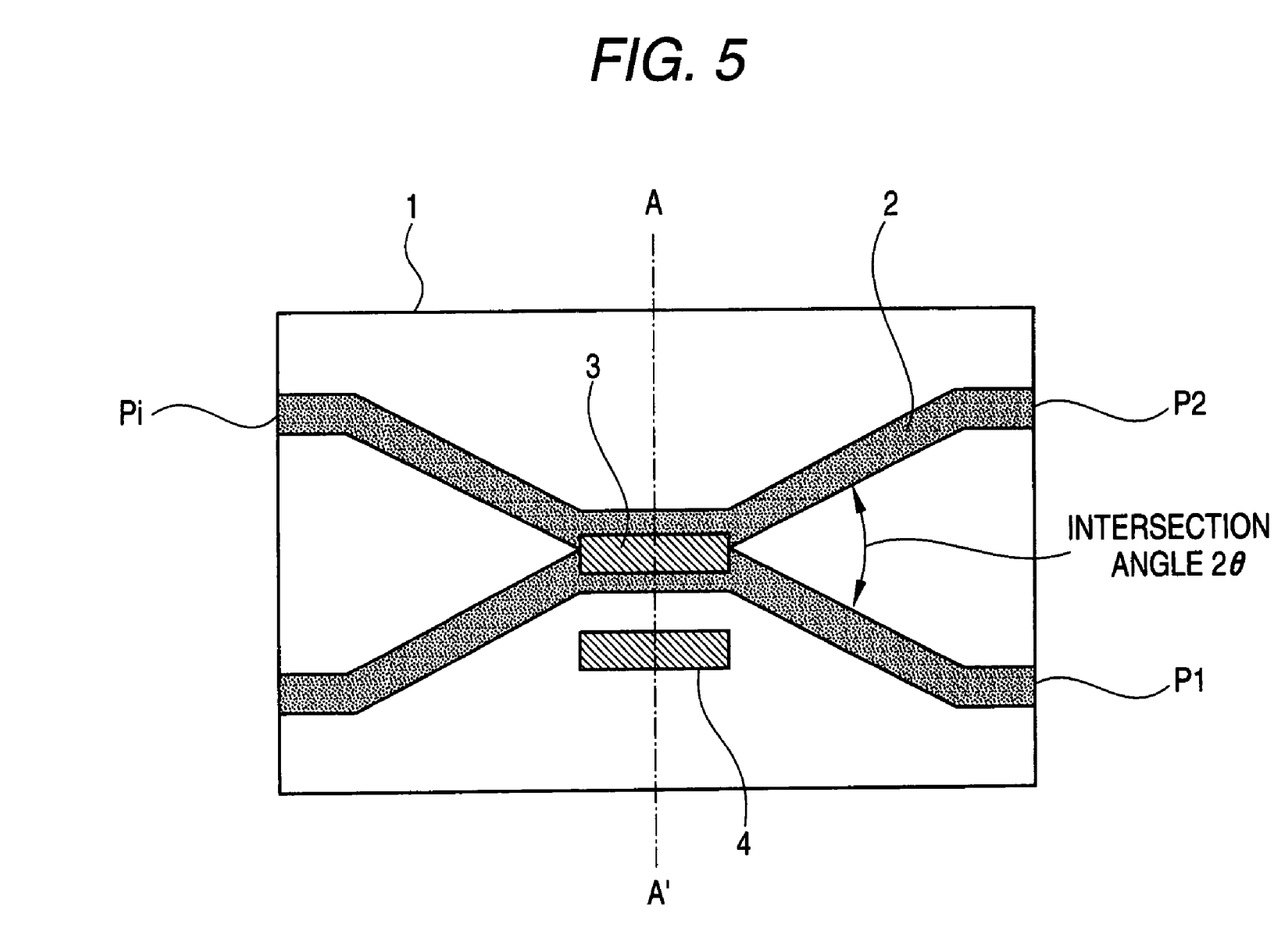
FIG. 5 is a plan view showing an example of the optical switch in the related art.
Figure 6:
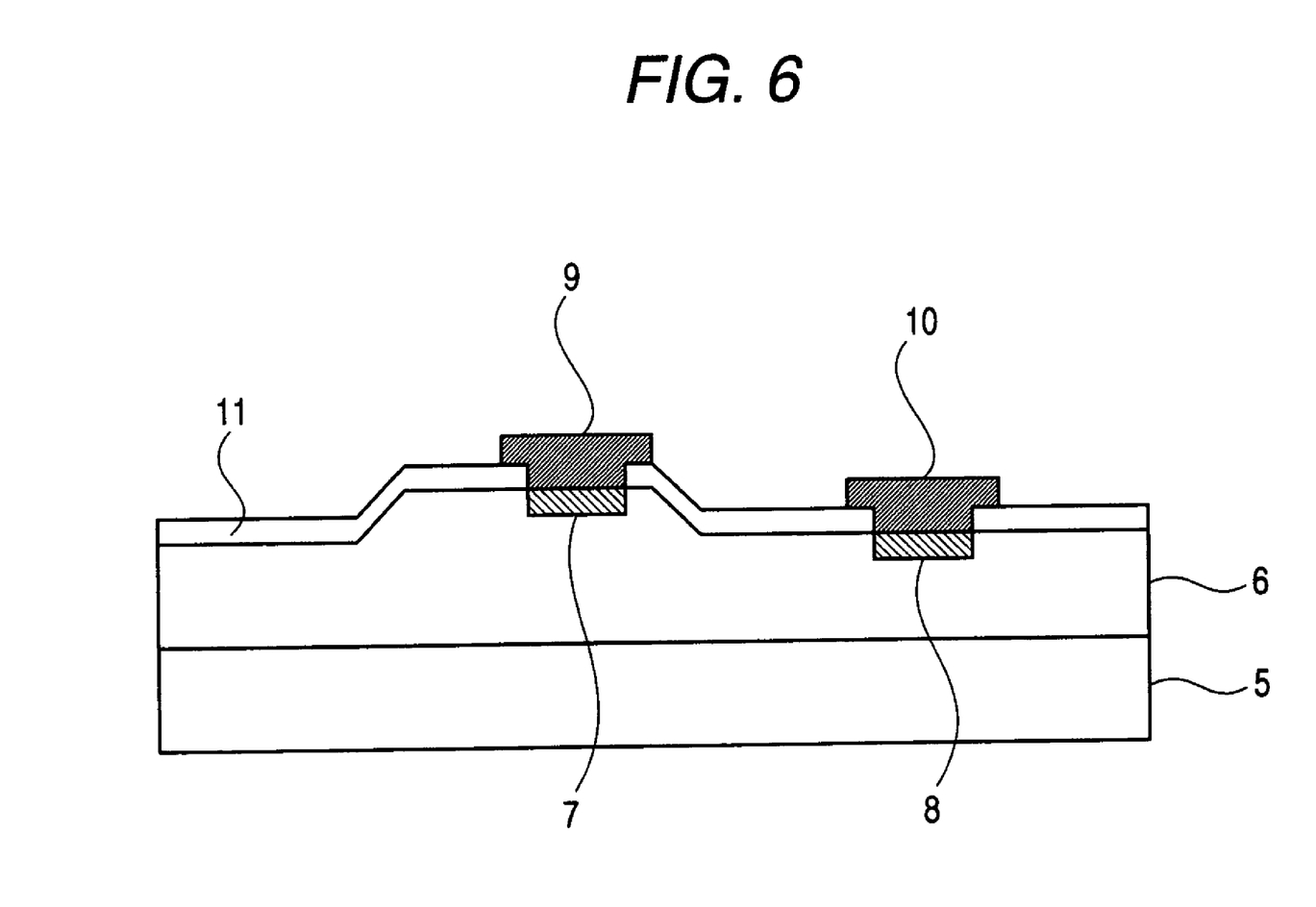
FIG. 6 is a sectional view showing the example of the optical switch in the related art.

FIG. 5 and FIG. 6 are a plan view and a sectional view showing an example of the carrier-injected optical waveguide type optical switch in the related art respectively (see Document 1, for example). In FIG. 5, an "X-shaped" optical waveguide 2 is formed on a substrate 1. An electrode 3 is formed in an intersection portion of the "X-shaped" optical waveguide 2. An electrode 4 is formed in close vicinity to the intersection portion of the "X-shaped" optical waveguide 2 in parallel with the electrode 3.

Meanwhile, FIG. 6 is a sectional view-taken along an "A-A'" line in FIG. 5. In FIG. 6, a substrate 5 is made of p-type Si, or the like. A core layer 6 is formed of a p-type SiGe layer, and is formed on the substrate 5. Then, most of the incident lights are guided by this core layer 6 to propagate through there. Also, the "X-shaped" optical waveguide 2 is formed in the core layer 6. A contact $n^+$-region 7 is formed in the intersection portion of the optical waveguide 2. A contact $p^+$-region 8 is formed in close vicinity to the intersection portion.

An insulating film 11 is made of $SiO_2$, or the like, and is formed on the core layer 6 except upper surfaces of the $n^+$-region 7 and the $p^+$-region 8. An n-side electrode 9 is formed on the $n^+$-region 7. A p-side electrode 10 is formed on the $p^+$-region 8.

Next, an operation of the related example shown in FIG. 5 and FIG. 6 will be explained hereunder.

When the optical switch is turned "OFF", no electric current is supplied to the electrode 3 (electrode 9) and the electrode 4 (electrode 10). For this reason, no change of the refractive index is caused in the intersection portion of the "X-shaped" optical waveguide 2 shown in FIG. 5. Therefore, for example, the light signal that is incident from an incident end Pi goes straight through the intersection portion, and then is output from an emergent end P1.

In contrast, when the optical switch is turned "ON", an electric current is supplied from the p-side electrode 10 to the n-side electrode 9 via the $n^+$-region 7. That is, the electrons are injected from the electrode 3 (electrode 9) and the holes are injected from the electrode 4 (electrode 10). Therefore, the carriers (electrons, holes) are injected into the intersection portion. Then, a carrier density is increased in the optical waveguide located near the $n^+$-region 7 side.

According to this increase of the carrier density, the refractive index in the intersection portion of the "X-shaped" optical waveguide 2 shown in FIG. 5 is changed to lower. For example, the light signal incident on the incident end Pi is totally reflected by a boundary between a low reflective index area generated in the intersection portion (an area of the optical waveguide 2 close to the $n^+$-region 7 side) and an area in which a change of the reflective index is seldom generated (a remaining half area of the optical waveguide 2), and then is output from an emergent end P2.

As a result, if the carriers (electrons, holes) are injected into the intersection portion of the "X-shaped" optical waveguide 2 (optical switch portion) by supplying the electric current to the electrode to control the reflective index in the intersection portion, it is feasible to control the position from which the light signal is output, in other words, switch the transmission path through which the light signal propagates.

Therefore, if a light reflection is generated in a condition that the boundary between the area, in which the change of the refractive index is generated because the carrier density is increased by the current injection, and the area, in which the change of the refractive index is not generated, is made definite in the optical waveguide 2, the light reflection area can be produced effectively.

Also, the change of the refractive index due to the carrier density is generated based on the plasma dispersion effect or the band filling effect (see Document 2 and Document 3, for example). Therefore, the change of the refractive index is increased at the same carrier density if effective masses of carriers (a free electron and a free hole) are small. For this reason, if the material system in which the effective mass is smaller is used, the large change of the refractive index can be generated by a smaller amount of current injection (smaller current density), and thus the optical switch that can be driven by the small current can be realized.

Figure 7:
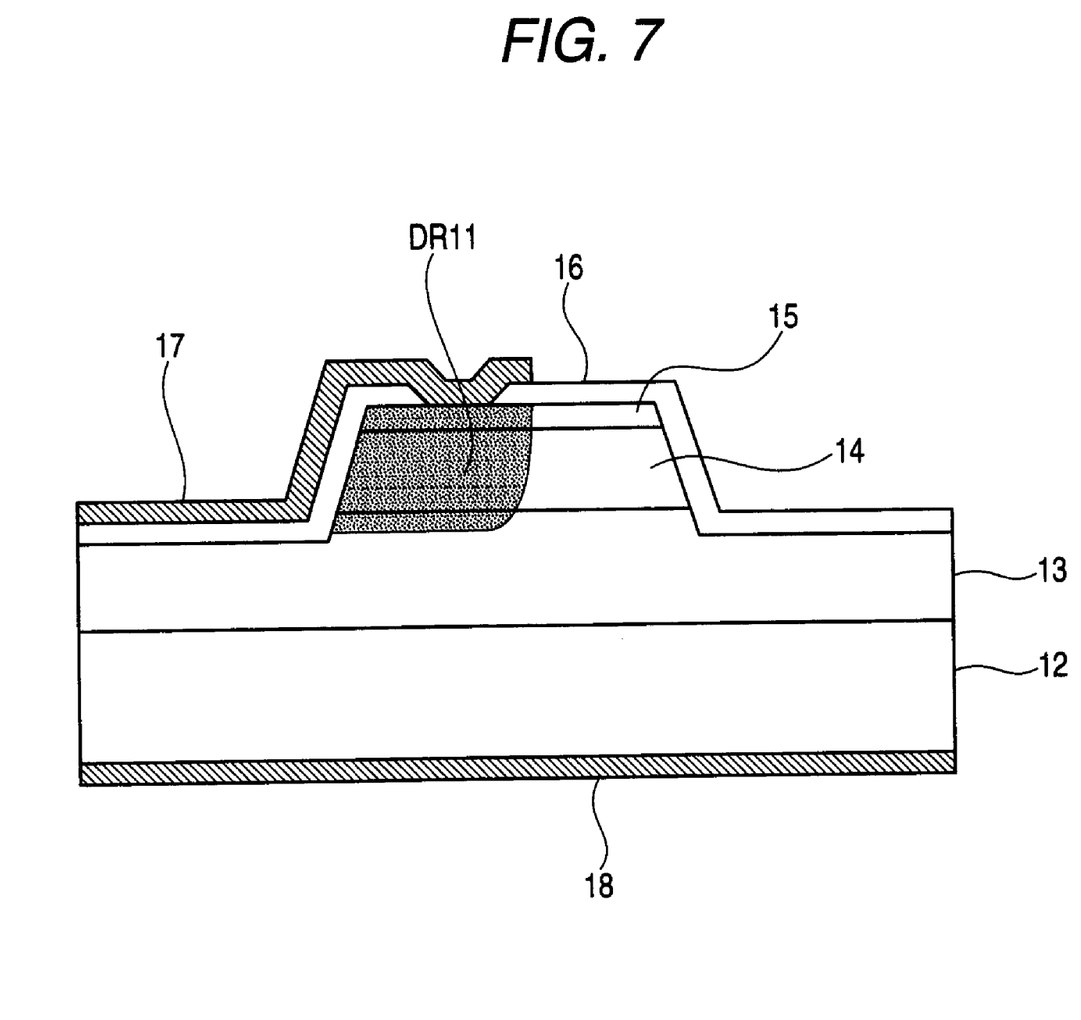
FIG. 7 is a sectional view showing an example of the related optical switch using the material system in which an effective mass of a carrier is small.

Next, an example of a sectional view of the related optical switch using the material system in which the effective masses of the carriers (the free electron and the free hole) is small (e.g., InP-based material) is shown in FIG. 7 (see Document 4, for example).

In FIG. 7, a substrate 12 is made of InP, or the like. A core layer 13 is formed of an n-type InGaAsP layer as a quaternary layer, for example, and is formed on the substrate 12. An n-type InP layer 14 is formed on the core layer 13. An n-type InGaAsP layer 15 is formed on the n-type InP layer 14. An insulating film 16 is made of $SiO_2$, or the like, and is formed on the InGaAsP layer 15. A p-side electrode 17 is formed on the insulating film 16, and an n-side electrode 18 is formed on the back surface of the substrate 12.

In the optical switch shown in FIG. 7, the core layer 13, the InP layer 14, and the InGaAsP layer 15 are formed sequentially on the substrate 12, and also the "X-shaped" optical waveguide is formed by etching respective layers up to the core layer 13.

Then, the p-type impurity is diffused into a portion indicated by "DR11" in FIG. 7. Then, the electrode 17 is formed to come into contact with the portion indicated by "DR11" in FIG. 7, and the electrode 18 is formed on the back surface.

In the related art shown in FIG. 7, since the material system in which the effective masses of the carriers (the free electron and the free hole) is small is used, the large change of the refractive index can be generated by a smaller amount of current injection (smaller current density), and thus the optical switch that can be driven by the small current can be realized.

Figure 4:
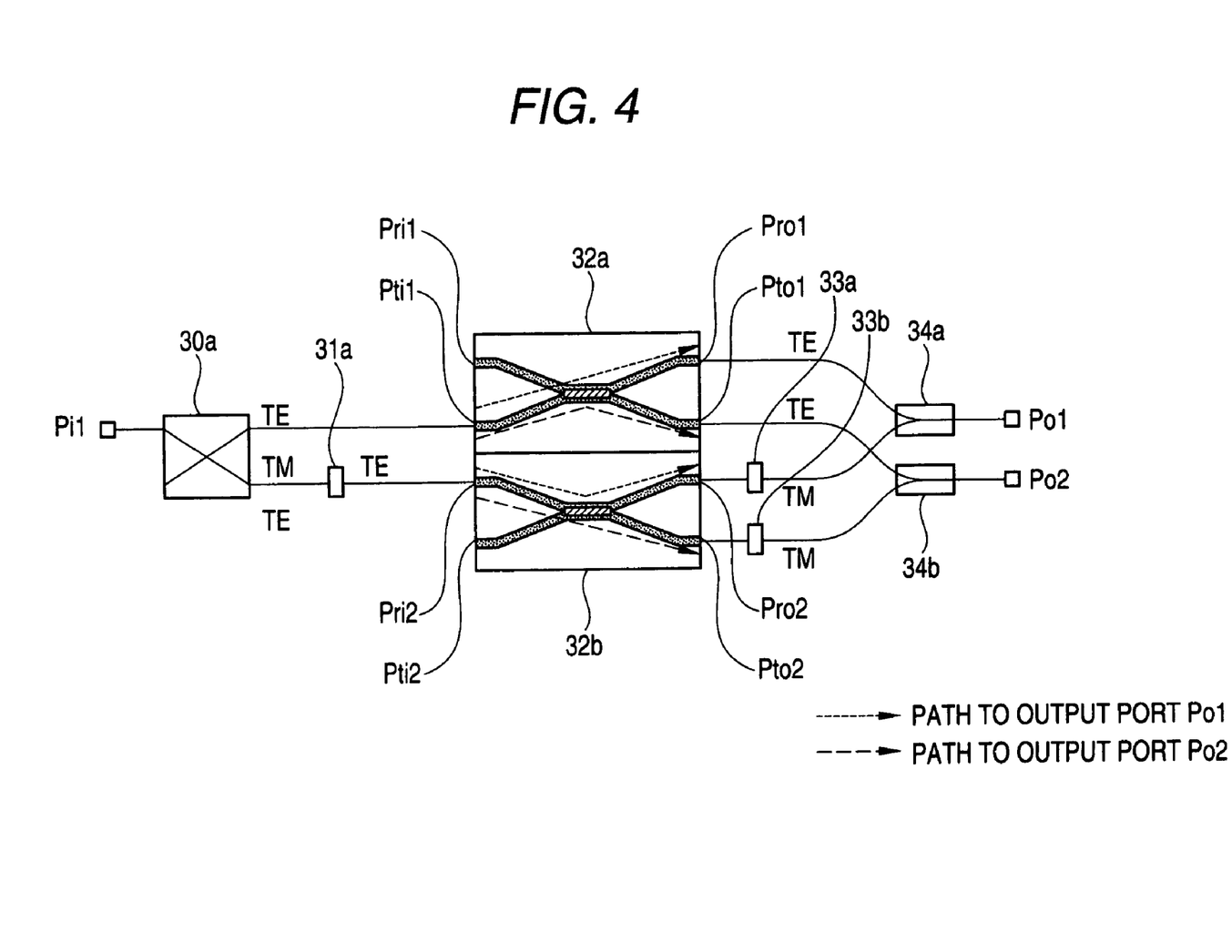
FIG. 4 is a configurative view showing a fourth embodiment of the present invention.
Figure 8:
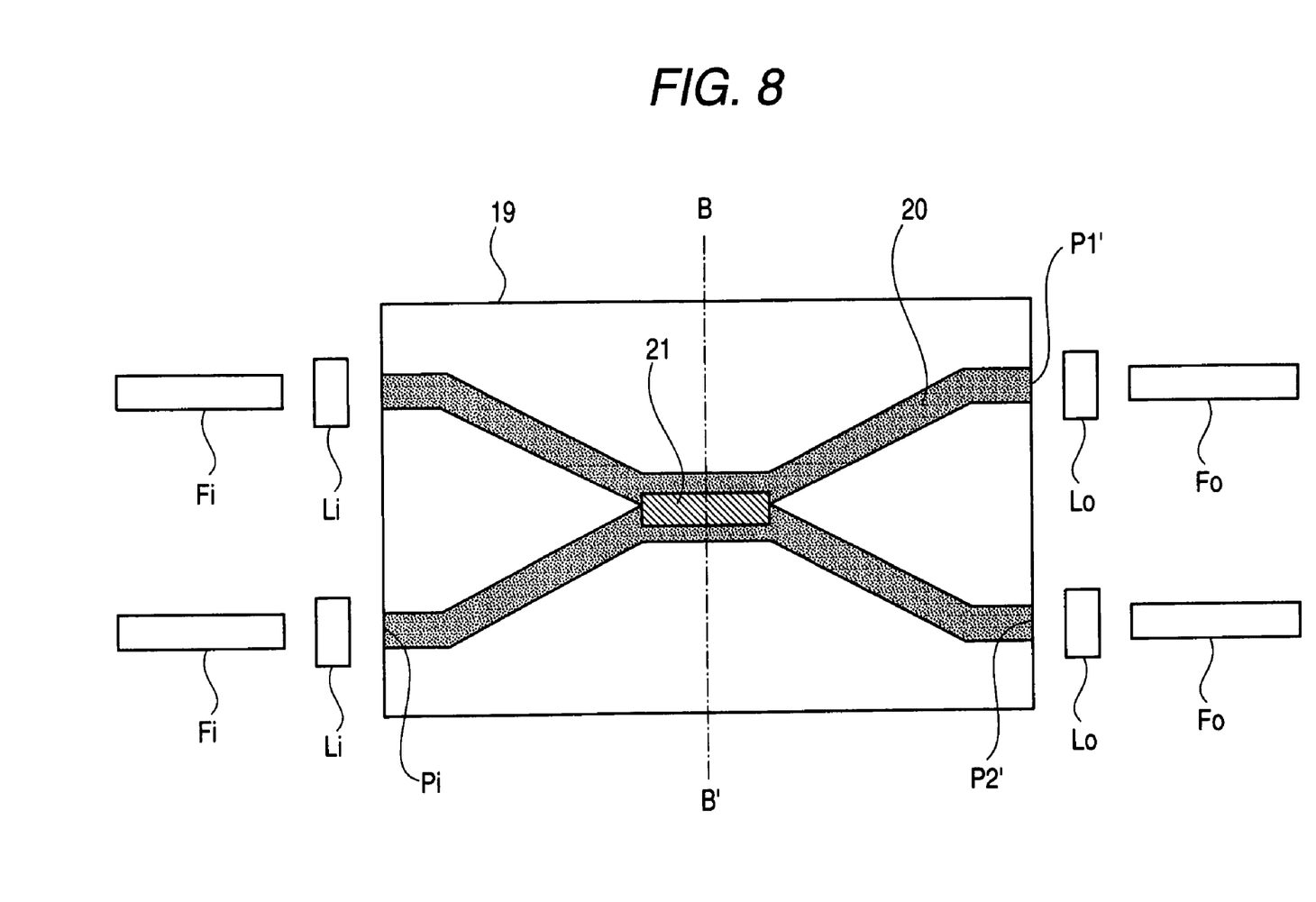
FIG. 8 is a plan view showing an example in which the related optical switch that limits a refractive-index changing area by using a current constriction is employed in the related light signal switching apparatus.
Figure 9:
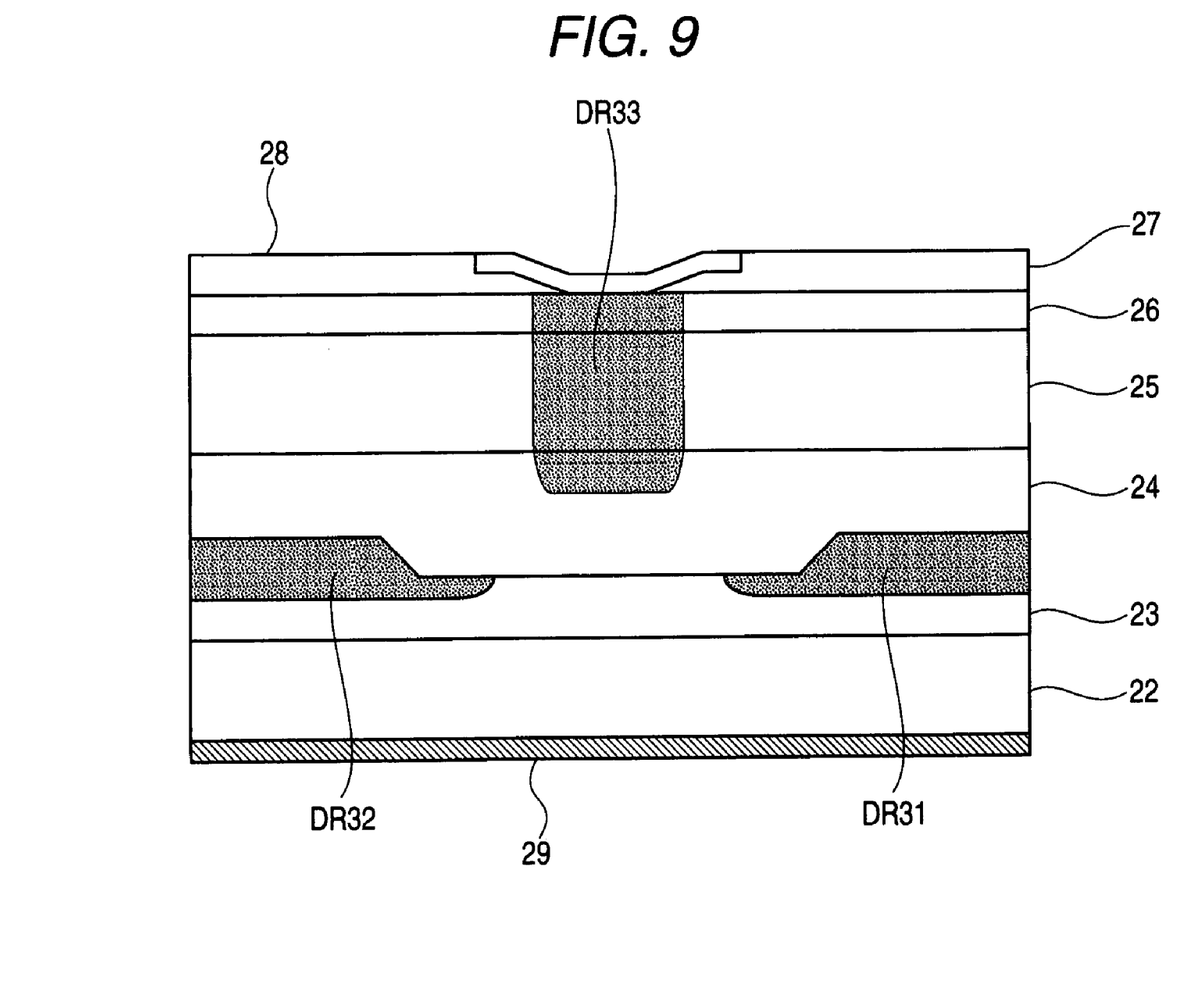
FIG. 9 is a sectional view showing an example of the related optical switch that limits the refractive-index changing area by using the current constriction.

Then, an optical switch having such a structure that limits the refractive-index changing area by using the current constriction will be explained hereunder. FIG. 8 and FIG. 9 are a plan view and a sectional view showing an example of the related optical switch, in which the current constriction is applied by providing a p-type region to the optical waveguide in the intersection portion and thus the refractive-index changing area is limited by limiting the high carrier density area, respectively (see Document 5, for example) Also, a configuration of the optical switch in the case where the optical switch is used actually as a light signal switching apparatus is shown in FIG. 4.

In FIG. 8, an "X-shaped" optical waveguide 20 is formed on a semiconductor substrate 19. An electrode 21 is formed in an intersection portion of the "X-shaped" optical waveguide 20. Also, the light signal is transmitted through an input optical fiber Fi, and then is incident on an incident end (e.g., Pi') of the optical switch by a converging lens system Li. Also, the light signal being emergent from an emergent end P1', P2' of the optical switch is incident on an output optical fiber Fo by a converging lens system Lo and is transmitted through there. In this case, both the input optical fiber Fi and the output optical fiber Fo consist of a single mode optical fiber respectively.

Meanwhile, FIG. 9 is a sectional view taken along a "B-B'" line in FIG. 8. In FIG. 9, a substrate 22 is made of InP, or the like, for example. A lower cladding layer 23 is formed of an n-type InP layer, for example, and is formed on the substrate 22. A core layer 24 is formed of an n-type InGaAsP layer, and is formed on the lower cladding layer 23. An upper cladding layer 25 is formed of an n-type InP layer, and is formed on the core layer 24. A contact layer 26 is formed of an n-type InGaAsP layer, and is formed on the upper cladding layer 25.

In FIG. 9, Zn as the p-type impurity is diffused into portions indicated by "DR31" to "DR33". An oxide layer 27 is made of $SiO_2$, or the like, and is formed on the contact layer 26 in the area except the diffusion area indicated by "DR33" in FIG. 9. A p-side electrode 28 is formed on the diffusion area indicated by "DR33" in FIG. 9. An n-side electrode 29 is formed on the back surface of the substrate 22.

Next, an operation of the related art shown in FIG. 8 and FIG. 9 will be explained hereunder. When the optical switch is turned "OFF", no electric current is supplied to the electrode 21 (electrode 28) and the electrode (not shown) formed on the back surface of the substrate 19 (corresponding to the electrode 29 in FIG. 9).

For this reason, no change of the refractive index is caused in the intersection portion of the "X-shaped" optical waveguide 20. Therefore, for example, the light signal that is incident on the incident end Pi' from the input optical fiber Fi and the converging lens system Li goes straight through the intersection portion, and then is output from the portion indicated by the emergent end P1'. Then, the light signal is transmitted through the output optical fiber Fo via the converging lens system Lo.

In contrast, when the optical switch is turned "ON", an electric current is supplied to the electrode 21 (electrode 28) and the electrode (not shown) formed on the back surface of the substrate 19 (electrode 29). Thus, the carriers (electrons, holes) are injected into the intersection portion.

Therefore, the refractive index of the intersection portion of the "X-shaped" optical waveguide 20 directly under the electrode 21 is changed by the plasma effect to become low. Thus, the light signal being input from the incident end Pi' is totally reflected by the boundary to the low reflective index portion produced in the intersection portion and emitted from the portion indicated by the emergent end P2'. Then, the light signal is transmitted through output optical fiber Fo via the converging lens system Lo.

As a result, if the carriers (electrons, holes) are injected into the intersection portion of the "X-shaped" optical waveguide 20 (optical switch portion) by supplying the electric current to the electrode to control the reflective index in the intersection portion, it is possible to control the position from which the light signal is output, in other words, switch the transmission path through which the light signal propagates.

[Document 1] Baujun Li, Guozheng Li, Enke Liu, Zuimin Jiang, Chengwen Pei and Xun Wang, "1.55 µm Reflection-type Optical Waveguide Switch based on SiGe/Si Plasma Dispersion Effect", Appl. Phys. Lett., Vol. 75, No. 1, pp. 1-3, (1999)

[Document 2] The Japan Society of Applied Physics (JSAP), Editors of Social Meeting for Optics Discussion, "Optical Integrated Circuit-Fundamentals and Application", first edition, Asakura Publishing Co., Ltd., Apr. 10, 1988, Chapter 5, p. 104

[Document 3] Baujun Li and Soo-Jin Chua, "2×2 Optical Waveguide Switch with Bow-Tie Electrode Based on Carrier-Injection Total Internal Reflection in SiGe Alloy", IEEE Photon Tech. Lett. Vol. 13, No. 3, pp. 206-208, 13 (2001)

[Document 4] Hiroaki Inoue, Hitoshi Nakamura, Kenichi Morosawa, Yoshimitsu Sasaki, Toshio Katsuyama, and Naoki Chinone, "An 8 mm Length Nonblocking 4×4 Optical Switch Array", IEEE Journal of Selected Areas in Communications, Vol. 6, No. 7, pp. 1262-1266, (1988)

[Document 5] K. Ishida, H. Nakamura, H. Matsumura, T. Kadoi, and H. Inoue, "InGaAsP/InP Optical Switches using Carrier Induced Refractive Index Change", Appl. Plys. Lett., Vol. 50, No. 19, pp. 141-142, (1987)

As shown in the related art in FIG. 5 and FIG. 8, the related optical switching element executes the optical switching operation by utilizing the reflection that is generated due to the reflective index change in the optical switch portion caused by the carrier injection. Also, the light incident on the incident end Pi (or the incident end Pi') is switched from the emergent end P1 to the emergent end P2 (or the emergent end P1' to the emergent end P2'), for example. Also, as shown in FIG. 8, the light signal switching apparatus is employed on the premise that the optical fibers Fi, Fo used to input/output the light are connected to the optical switch single body via the converging lens systems Li, Lo respectively. Therefore, improvement of the characteristics of the optical switching element can be achieved.

However, in case the light signal switching apparatus is constructed in this manner, an optical power intensity (an extinction ratio and an insertion loss of respective outputs) derived when the light incident on the incident end Pi, Pi' is switched to the transmission-side emergent end P1, P1' or the reflection-side emergent end P2, P2' depends upon the polarization of the incident light. The element structures containing the optical waveguide structure of the optical switch element, the structure of the optical switch portion, and the profile of the reflective-index changing area by the carrier injection exert an influence complexly upon this polarization dependency.

Also, a ratio of the optical power intensities that are switched to the emergent end P1 and the emergent end P2, the emergent end P1' and the emergent end P2' is changed by the structure of the optical switch portion (the reflective-index changing area, an intersection angle of the optical waveguides, etc.), a width of the optical waveguide, and the like. And, normally the optical power intensity on the transmission side tends to increase.

Also, there existed the problem, as long as the light signal switching apparatus employs the structure adopted in the related art (structure in which the optical fibers Fi, Fo used to input/output the light are connected to the optical switch single body via the converging lens systems Li, Lo respectively), it is difficult for such light signal switching apparatus to overcome these subjects.

In particular, the light signal incident on the light signal switching apparatus is transmitted over the optical fiber having a length of several tens [m] to several [km] or more. Therefore, the polarization of the transmitted light signal is varied in time depending on variations in the environments (for example, pressure, temperature, magnetic field, etc.) in which the optical fiber is laid down. As a result, in the case where the light signal switching apparatus is used actually, there existed the problem, in the configuration of the light signal switching apparatus using the optical switch element shown in the related art, an output intensity of the light being switched by the optical switch portion is changed according to the polarized condition of the incident light.

In contrast, in the case where the subject about the polarization dependency in the light signal switching apparatus should be avoided by using the polarization maintaining optical fiber that preserves the polarized condition, the waveform of the light signal is deteriorated because normally the propagation light is affected largely by PMD (Polarization Mode Dispersion) in the light signal switching apparatus. Therefore, it was difficult to transmit the light signal over the long distance at an optical bit rate in the [Gbps] band.

SUMMARY OF THE INVENTION

An object of the present invention is to provide a light signal switching apparatus capable of reducing the polarization dependency.

The invention provides a light signal switching apparatus which has an input port to which an input light signal is input and a plurality of output ports which outputs an output light signal, wherein the light signal switching apparatus outputs the output light signal from a desired output port out of the plurality of output ports, having: a splitting element which polarizes an input light signal fed from the input port into a first component including a first polarized light signal and a second component including a second polarized light signal, whose polarization planes are different mutually by 90 degrees, to output the first polarized light signal and the second polarized light signal; a first polarization controlling element which rotates a polarization plane of the second polarized light signal by 90 degrees to output a third polarized light signal; a first optical switch which switches a path of the first polarized light signal fed from the splitting element to the desired output port side, to output the first polarized light signal; a second optical switch which switches a path of the third polarized light signal fed from the first polarization controlling element to the desired output port side, to output the third polarized light signal; a second polarization controlling element which rotates a polarization plane of the first polarized light signal fed from the first optical switch by 90 degrees to output a fourth polarized light signal; and a combiner which combines the third polarized light signal fed from the second optical switch with the fourth polarized light signal fed from the second polarization controlling element, to output a combined light signal to the desired output port.

The invention also provides a light signal switching apparatus which has an input port to which an input light signal is input and a plurality of output ports which outputs an output light signal, wherein the light signal switching apparatus outputs the output light signal from a desired output port out of the plurality of output ports, having: a splitting element which polarizes an input light signal fed from the input port into a first component including a first polarized light signal and a second component including a second polarized light signal, whose polarization plate are different mutually by 90 degrees, to output the first polarized light signal and the second polarized light signal; a first polarization controlling element which rotates a polarization plane of the second polarized light signal by 90 degrees to output a third polarized light signal; a first optical switch which switches a path of the first polarized light signal fed from the splitting element to the desired output port side, to output the first polarized light signal; a second optical switch which switches a path of the third polarized light signal fed from the first polarization controlling element to the desired output port side, to output the third polarized light signal; a second polarization controlling element which rotates a polarization plane of the third polarized light signal fed from the second optical switch by 90 degrees to output a fourth polarized light signal; and a combiner which combines the first polarized light signals fed from the first optical switch with the fourth polarized light signal fed from the second polarization controlling element, to output a combined light signal to the desired output port.

In the light signal switching apparatus, the splitting element splits the input light signal into a TE light and a TM light.

In the light signal switching apparatus, each of the first polarization controlling element and the second polarization controlling element is a $\lambda/2$ plate.

In the light signal switching apparatus, the first optical switch and the second optical switch execute a switching of the path complementarily.

In the light signal switching apparatus, the first optical switch and the second optical switch are formed on a same substrate.

The light signal switching apparatus further has a plurality of input ports, wherein the first polarization controlling element is provided every input port.

In the light signal switching apparatus, each of the first optical switch and the second optical switch is a carrier-injected optical waveguide type optical switch.

According to the light signal switching apparatus, the first polarization controlling element rotates a polarization plane of the one polarized component polarized by the splitting element to be the same polarization plane as the other polarized component. Then, after the light signal is passed through the optical switch, the second polarization controlling element rotates a polarization plane of the other polarized component to be perpendicular to the polarized plane of the one polarized component. Then, the combiner combines respective light signals together, and outputs the combined light signal to the desired output port. Therefore, because the polarized lights transmitted through the optical switches are limited to either of polarization components, it is possible to obtain the light signal switching apparatus that is capable of reducing extremely the polarization dependency of the incident light signal even though the optical switching characteristics have the polarization dependency. As a result, since the light signal switching apparatus can be employed for the actual optical network, optical computing equipment, optical measuring apparatus, and the like, the practical value of the apparatus can be very enhanced.

Further, the light signals polarized by the splitting element are passed through the polarization controlling elements same times (once) respectively. As a result, the influences of the polarization controlling element (e.g., loss of the optical power, and the like) can be lessened.

Further, when the one optical switch is switching the path of the optical waveguide to the emergent end on the reflection side, the other optical switch switches simultaneously the path of the optical waveguide to the emergent end on the transmission side. Therefore, even when two optical switches have a different attenuation value (insertion loss) between the transmission side and the reflection side in the optical switching respectively, this difference in the attenuation value can be reduced because two optical switches execute the switching operation of the path complementarily. Accordingly, a difference in the attenuation value of the optical signal passing from the input port to the output ports can be reduced as a consequence.

Further, two optical switches are formed in close vicinity to each other on the same substrate, and are operated in the complementary way (the carrier injection is always applied to either of two optical switches). Therefore, the influence of heat generation due to the carrier injection can be reduced.

DETAILED DESCRIPTION OF THE PREFERRED EMBODIMENTS

Embodiments of the present invention will be explained with reference to the drawings hereinafter.

First Embodiment

Figure 1:
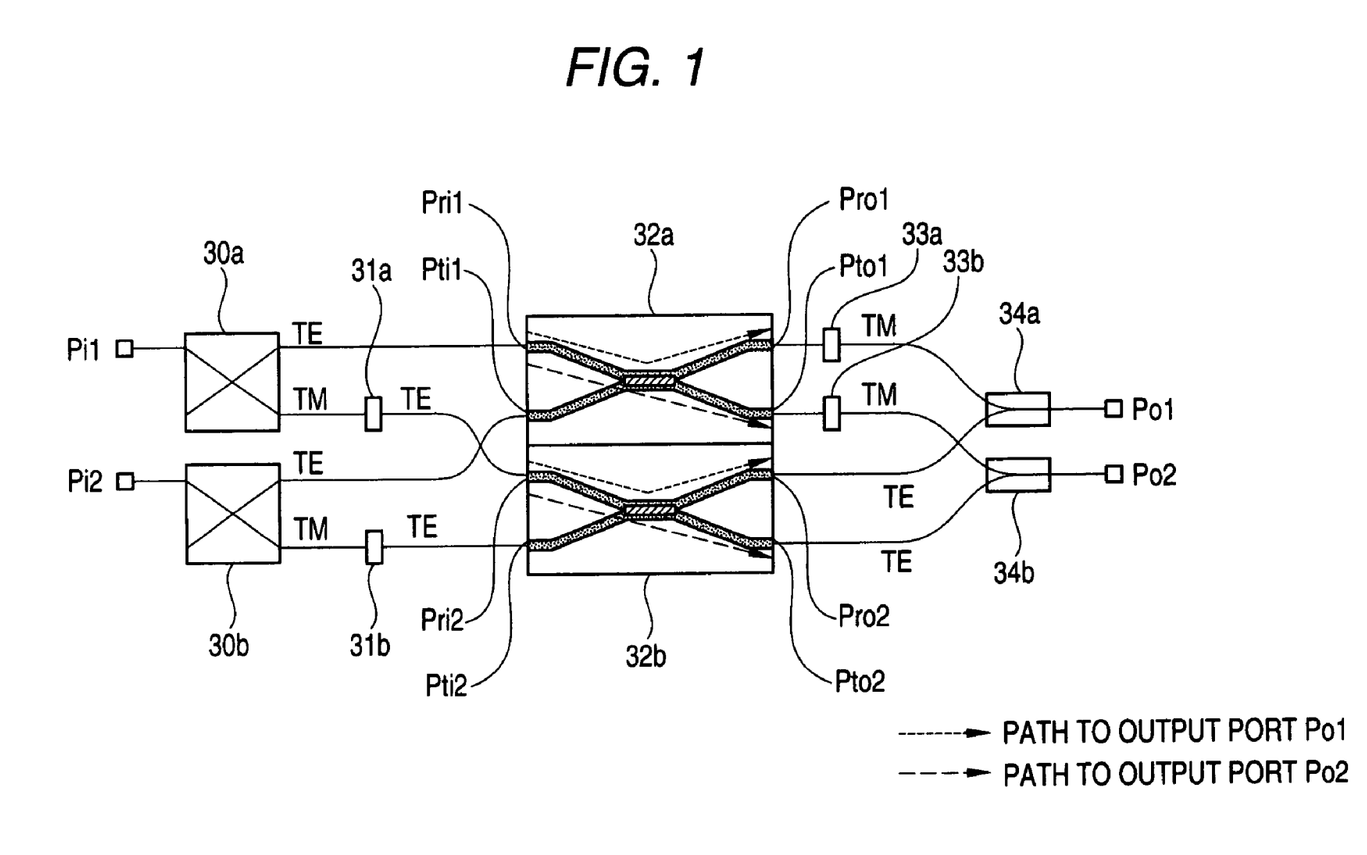
FIG. 1 is a configurative view showing a first embodiment of the present invention.

FIG. 1 is a configurative view showing a first embodiment of the present invention, and shows a light signal switching apparatus of 2-input (input ports Pi1, Pi2)/2-output (output ports Po1, Po2) type. In FIG. 1, polarization beam splitters 30a, 30b are a splitting element that splits the input light signal into first and second polarization components whose planes of polarization are different from each other by 90 degrees (e.g., a TE (Transverse Electric Wave) light and a TM (Transverse Magnetic Wave) light) and then outputs these components, respectively. Also, the polarization beam splitters 30a, 30b are provided to the input ports Pi1, Pi2 respectively, and are connected to the input ports Pi1, Pi2.

Then, $\lambda/2$ plates 31a, 31b are a first polarization controlling element respectively. The $\lambda/2$ plates 31a, 31b. convert the TM lights transmitted from the polarization beam splitters 30a, 30b to the TE lights by rotating the plane of polarization by 90 degrees, and then output the TE lights from there.

First and second carrier-injected optical waveguide type optical switches 32a, 32b are the optical switch element shown in FIG. 5 to FIG. 9 respectively, for example, and are formed on the same substrate in close vicinity to each other. The first and second carrier-injected optical waveguide type optical switches 32a, 32b switch the path of the incident light signal to the desired side of the output ports Po1, Po2, and outputs the light signal from there.

The optical switch 32a has incident ends Pri1, Pti1, and emergent ends Pro1, Pto1. The TE light fed from the polarization beam splitter 30a is incident on the incident end Pri1, and also the TE light fed from the polarization beam splitter 30b is incident on the incident end Pti1.

The optical switch 32b32a has incident ends Pri2, Pti2, and emergent ends Pro2, Pto2. The TE light fed from the $\lambda/2$ plate 31a is incident on the incident end Pri2, and also the TE light fed from the $\lambda/2$ plate 31b is incident on the incident end Pti2.

Then, $\lambda/2$ plates 33a, 33b are a second polarization controlling element respectively. The $\lambda/2$ plates 33a, 33b are convert the TE lights transmitted from the emergent ends Pro1, Pto1 of the optical switch 32a to the TM lights by rotating the plane of polarization by 90 degrees respectively, and then output the TM lights from there.

An optical coupler 34a couples the light signal from the $\lambda/2$ plate 33a with the light signal from the emergent end Pro2 of the optical switch 32b, and then outputs the resultant signal to the output port Po1. An optical coupler 34b couples the light signal from the $\lambda/2$ plate 33b with the light signal from the emergent end Pto2 of the optical switch 32b, and then outputs the resultant signal to the output port Po2. In this case, each of the optical couplers 34a, 34b constitutes a combiner.

An operation of such light signal switching apparatus will be explained hereunder. As the particular example, the case where the light signal is input from the input port Pi1 will be explained herein. The light signal being input from the input port Pi1 is split into the TE light and the TM light by the polarization beam splitter 30a. Then, the TM light is converted into the TE light by the $\lambda/2$ plate 31a.

The TE lights fed from the polarization beam-splitter 30a and the $\lambda/2$ plate 31a respectively are incident on the optical switches 32a, 32b. The paths of the light signals are switched to the emergent ends Pto1, Pto2 acting as the transmission sides (to pass through the optical waveguides indicated by a long dashed line in FIG. 1) or the emergent ends Pro1, Pro2 acting as the reflection sides (to pass through the optical waveguides indicated by a dotted line in FIG. 1) by the switching operation of the optical switch portion in which the optical waveguides intersect with each other, and then the light signals are output from there. That is, the optical switches 32a, 32b carries out the same path switching operation at the same time. For example, the optical switch portion is turned "ON" when the light signal is to be output to the output port Po1 side, while the optical switch portion is turned "OFF" when the light signal is to be output to the output port Po2 side.

Then, when the light signal is to be output to the output port Po1, the TE light fed from the emergent end Pro1 is converted into the TM light by the λ/2 plate 33a, then is coupled with the TE light fed from the emergent end Pro2, and then is output from the output port Po1.

Also, when the light signal is to be output to the output port Po2, the TE light fed from the emergent end Pto1 is converted into the TM light by the λ/2 plate 33b, then is coupled with the TE light fed from the emergent end Pto2, and then is output from the output port Po2.

It is of course that similarly the switching operation to the output port Po1 or Po2 can be applied to the light signal being input from the input port Pi2 by the optical switches 32a, 32b.

In this manner, the λ/2 plates 31a, 31b convert the TM lights being split by the polarization beam splitters 30a, 30b to the TE lights. Then, the split TE light and the converted TE light pass through the optical switches 32a, 32b. Then, the λ/2 plates 33a, 33b convert the TE light, which is not subjected to the conversion after such light is passed through the optical switch 32a, into the TM light. Then, the optical couplers 34a, 34b couple the light signals consisting of the TE light and the TM light together, and output the resultant light signal to the desired output port Po1, Po2 respectively. Therefore, because the polarized lights transmitted through the optical switches 32a, 32b are limited to either of polarization components respectively, it is possible to realize the light signal switching apparatus that is capable of reducing remarkably the polarization dependency of the incident light signal even though the optical switching characteristics have the polarization dependency. As a result, since such light signal switching apparatus can be employed in the actual optical network, optical computing equipment, optical measuring apparatus, and the like, the practical value of this apparatus can be very enhanced. For example, since the polarization of the input light signal is varied in the actual light signal switching apparatus using the optical fiber, this apparatus in which a variation in the output of the switched light signal can be reduced is of great value in the practical use.

Also, the TM light and the TE light split by the polarization beam splitters 30a, 30b are passed through the λ/2 plates 31a, 31b, 33a, 33b same times (once) respectively. Therefore, the influences of the λ/2 plate (e.g., loss of the optical power, and the like) can be lessened.

Second Embodiment

Figure 2:
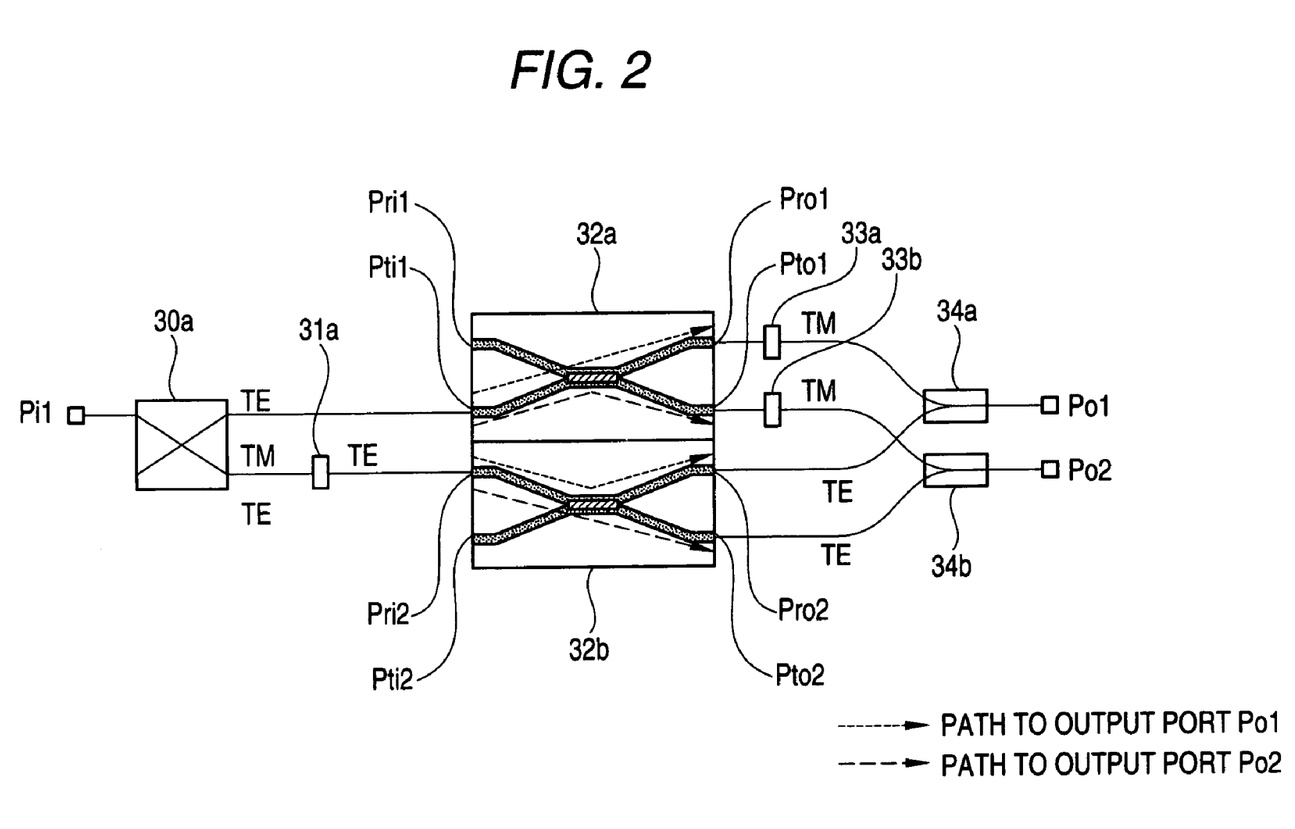
FIG. 2 is a configurative view showing a second embodiment of the present invention.

FIG. 2 is a configurative view showing a second embodiment of the present invention, which shows an example of a light signal switching apparatus of the 1-input (input port Pi1) and 2-output (output ports Po1, Po2) type. In the apparatus shown in FIG. 1, such a configuration that operates to turn "ON" or "OFF" the optical switches 32a, 32b simultaneously is shown, but an example of the configuration that operates complementarily will be explained herein. Here, the same reference symbols are affixed to the same portions as those in FIG. 1, and their explanation will be omitted herein. In FIG. 2, the input port Pi2, the polarization beam splitter 30b, and the λ/2 plate 31b are removed.

In the optical switch 32a, the TE light split by the polarization beam splitter 30a is incident on the incident end Pti1 instead of the incident end Pri1.

An operation of such light signal switching apparatus will be explained hereunder.

The light signal being input from the input port Pi1 is split into the TE light and the TM light by the polarization beam splitter 30a. Then, the TM light is converted into the TE light by the λ/2 plate 31a. Then, the TE light fed from the polarization beam splitter 30a is incident on the optical switch 32a, and the TE light fed from the λ/2 plate 31a is incident on the optical switch 32b.

Here, when the light signal is to be output to the output port Po1 side, the optical switch 32a is switched to the emergent end Pro1 acting as the transmission side (indicated by a dotted line in FIG. 2) because the optical switching portion is turned "OFF". Also, the optical switch 32b is switched to the emergent end Pro2 acting as the reflection side (indicated by a dotted line in FIG. 2) because the optical switching portion is turned "ON".

In contrast, when the light signal is to be output to the output port Po2 side, the optical switch 32a is switched to the emergent end Pto1 acting as the reflection side (indicated by a long dashed line in FIG. 2) because the optical switching portion is turned "ON". Also, the optical switch 32b is switched to the emergent end Pto2 acting as the transmission side (indicated by a long dashed line in FIG. 2) because the optical switching portion is turned "OFF".

The operation of the apparatus executed after the light signal is output from the optical switch 32a, 32b is similar to that of the apparatus shown in FIG. 1. Therefore, its explanation will be omitted herein.

In this fashion, two optical switches 32a, 32b are operated in the complementary way. In other words, when one optical switch is switching the path of the optical waveguide to the emergent end on the reflection side, the other optical switch switches simultaneously the path of the optical waveguide to the emergent end on the transmission side. Therefore, in the case where two optical switches 32a, 32b have a different attenuation value (insertion loss) between the transmission side and the reflection side in the optical switching respectively, this difference in the attenuation value can be reduced because two optical switches 32a, 32b are operated complementarily. Accordingly, a difference in the attenuation value of the optical signal passing from the input port Pi1 to the output ports Po1, Po2 can be reduced as a consequence.

Also, two optical switches 32a, 32b are formed in close vicinity to each other on the same substrate, and are operated in the complementary way (the carrier injection is always applied to either of two optical switches). Therefore, the influence of heat generation due to the carrier injection can be reduced.

Third Embodiment

Figure 3:
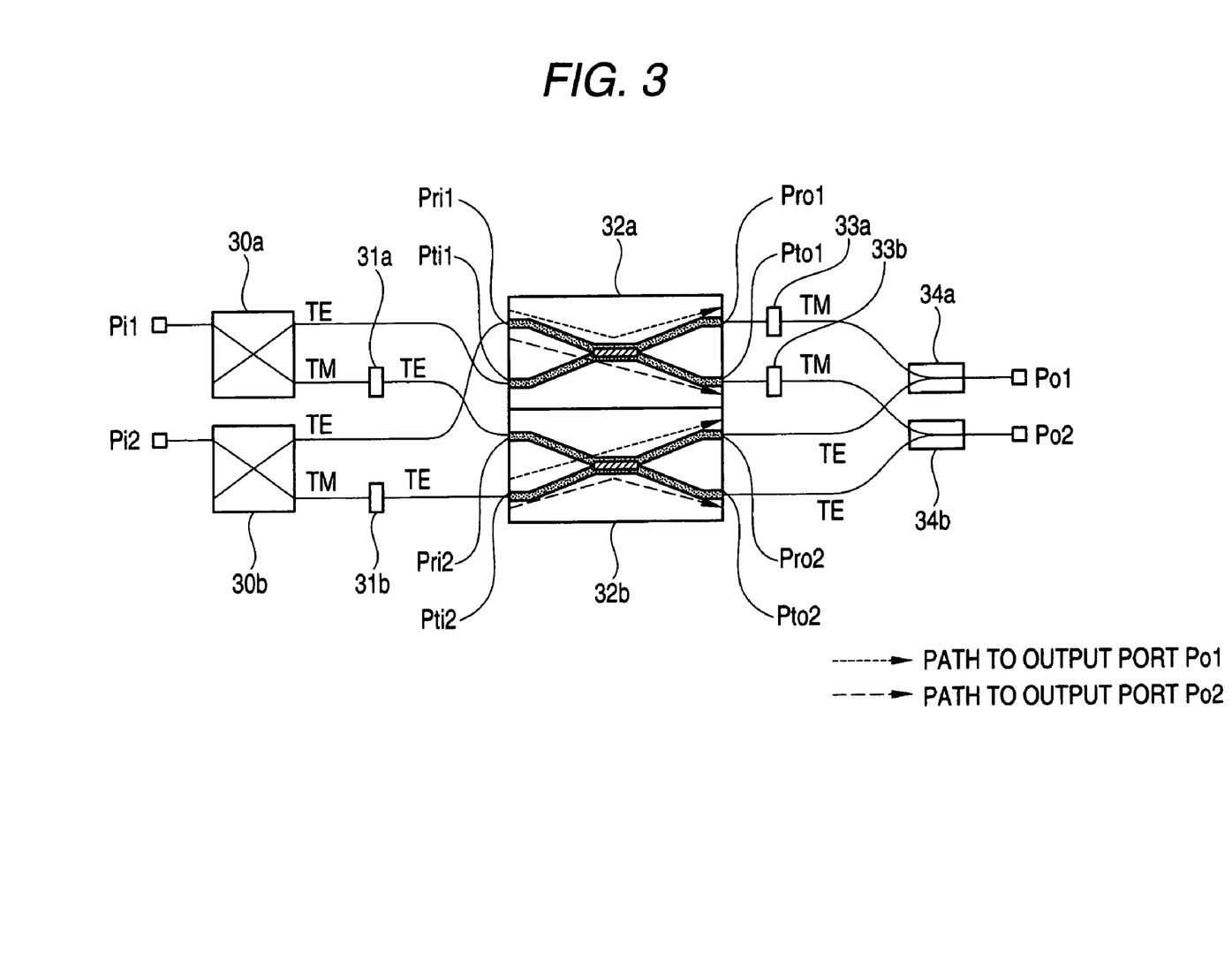
FIG. 3 is a configurative view showing a third embodiment of the present invention.

FIG. 3 is a configurative view showing a third embodiment of the present invention, which shows an example in which the apparatus shown in FIG. 2 is applied to a light signal switching apparatus of the 2-input (input ports Pi1, Pi2) and 2-output (output ports Po1, Po2) type. In FIG. 3, the input port Pi2, the polarization beam splitter 30b, and the λ/2 plate 31b, which are similar to those shown in FIG. 1, are provided.

The polarization beam splitter 30b, the input side of which is connected to the input port Pi2, splits the input light signal into the TE light and the TM light and then outputs the TE light to the incident end Pri1 of the optical switch 32a. The λ/2 plate 31b converts the TM light from the polarization beam splitter 30b into the TE light, and then outputs the TE light to the incident end Pti2 of the optical switch 32b.

That is, in the apparatus shown in FIG. 3, respective connections between the incident ends Pri1, Pti1 of the optical switch 32a and the polarization beam splitters 30a, 30b are replaced with those in the apparatus shown in FIG. 1.

An operation of such light signal switching apparatus will be explained hereunder. The operation executed when the light signal is input from the input port Pi1 is similar to that of the apparatus shown in FIG. 2, and therefore their explanation will be omitted herein.

The light signal being input from the input port Pi2 is split into the TE light and the TM light by the polarization beam splitter 30b. Then, the TM light is converted into the TE light by the λ/2 plate 31b. The TE light fed from the polarization beam splitter 30b is incident on the optical switch 32a, and the TE light fed from the λ/2 plate 31b is incident on the optical switch 32b.

Here, when the light signal is to be output to the output port Po1 side, the optical switch 32a is switched to the emergent end Pro1 acting as the reflection side (indicated by a dotted line in FIG. 3) because the optical switching portion is turned "ON". Also, the optical switch 32b is switched to the emergent end Pro2 acting as the transmission side (indicated by a dotted line in FIG. 3) because the optical switching portion is turned "OFF".

In contrast, when the light signal is to be output to the output port Po2 side, the optical switch 32a is switched to the emergent end Pto1 acting as the transmission side (indicated by a long dashed line in FIG. 3) because the optical switching portion is turned "OFF". Also, the optical switch 32b is switched to the emergent end Pto2 acting as the reflection side (indicated by a long dashed line in FIG. 3) because the optical switching portion is turned "ON".

The operation of the apparatus executed after the light signal is output from the optical switch 32a, 32b is similar to that of the apparatus shown in FIG. 1. Therefore, its explanation will be omitted herein.

In this fashion, even though the light signal is input into either of the input ports Pi1, Pi2, two optical switches 32a, 32b are operated in the complementary way. In other words, when one optical switch is switching the path of the optical waveguide to the emergent end on the reflection side, the other optical switch switches simultaneously the path of the optical waveguide to the emergent end on the transmission side. Therefore, in the case where two optical switches 32a, 32b have a different attenuation value (insertion loss) between the transmission side and the reflection side in the optical switching respectively, this difference in the attenuation value can be reduced because two optical switches 32a, 32b are operated complementarily. Accordingly, a difference in the attenuation value of the optical signal passing from the input port Pi1 to the output ports Po1, Po2 can be reduced as a consequence.

Also, two optical switches 32a, 32b are formed in close vicinity to each other on the same substrate, and are operated in the complementary way (the carrier injection is always applied to either of two optical switches). Therefore, the influence of heat generation due to the carrier injection can be reduced.

In this case, the present invention is not limited to this, and followings may be employed.

In the above, such a configuration is shown that the λ/2 plates 31a, 31b convert the TM light into the TE light respectively and only the TE light is incident on the optical switches 32a, 32b. But such a configuration may be employed that the TE light is converted into the TM light and only the TM light is incident on the optical switches 32a, 32b. Of course, this TM light is converted into the TE light after the light signal is transmitted through the optical switch 32b. By way of example, explanation will be made of the apparatus in FIG. 1. In FIG. 1, the λ/2 plates 31a, 31b convert the TE light from the polarization beam splitters 30a, 30b into the TM light respectively, and output this TM light to the optical switch 32a. Then, the λ/2 plates 33a, 33b convert the TM light from the polarization beam splitters 30a, 30b into the TE light respectively, and output this TE light to the optical couplers 34a, 34b.

Also, such a configuration is shown that the TE light and the TM light being split by the polarization beam splitters 30a, 30b are passed through the λ/2 plates 31a, 31b, 33a, 33b once respectively to convert the plane of polarization. But only the TE light (or the TM light) may be converted twice. FIG. 4 is a configurative view showing a fourth embodiment of the present invention. Here, the same reference symbols are affixed to the same portions as those in FIG. 2, and their explanation will be omitted herein. In FIG. 4, the λ/2 plates 33a, 33b are provided to the later stage of the optical switch 32b in place of the later stage of the optical switch 32a respectively. Then, the λ/2 plates 33a, 33 convert the TE light (which has already been converted once) fed from the optical switch 32b into the TM light and then output this TM light to the optical couplers 34a, 34b respectively.

Also, in the apparatus shown in FIG. 1, the configuration of the light signal switching apparatus of the 2-input/2-output type is shown. But the number of the input and the output may be set to any number.

In addition, in the apparatuses shown in FIG. 1 to FIG. 4, the optical switches 32a, 32b are formed in close vicinity to each other on the same substrate. But these optical switches 32a, 32b may be formed on individual substrates.

What is claimed is:

1. A light signal switching apparatus which comprises a plurality of input ports to which an input light signal is input and a plurality of output ports which output an output light signal, wherein the light signal switching apparatus outputs the output light signal from a desired output port out of the plurality of output ports, comprising:

a splitting element which polarizes an input light signal fed from the input port into a first component comprising a first polarized light signal and a second component comprising a second polarized light signal, whose polarization planes are different mutually by 90 degrees, to output the first polarized light signal and the second polarized light signal;

a first polarization controlling element which rotates a polarization plane of the second polarized light signal by 90 degrees to output a third polarized light signal;

a first optical switch which switches a path of the first polarized light signal fed from the splitting element to the desired output port side, to output the first polarized light signal;

a second optical switch which switches a path of the third polarized light signal fed from the first polarization controlling element to the desired output port side, to output the third polarized light signal;

a second polarization controlling element which rotates a polarization plane of the first polarized light signal fed from the first optical switch by 90 degrees to output a fourth polarized light signal; and a combiner which combines the third polarized light signal fed from the second optical switch with the fourth polarized light signal fed from the second polarization controlling element, to output a combined light signal to the desired output port, wherein the first polarization controlling element is provided at every input port.

2. The light signal switching apparatus according to claim 1,
wherein the splitting element splits the input light signal into a TE light and a TM light.

3. The light signal switching apparatus according to claim 1,
wherein each of the first polarization controlling element and the second polarization controlling element is a λ/2 plate.

4. The light signal switching apparatus according to claim 1,
wherein the first optical switch and the second optical switch execute a switching of the path complementarily.

5. The light signal switching apparatus according to claim 4,
wherein the first optical switch and the second optical switch are formed on a same substrate.

6. The light signal switching apparatus according to claim 1,
wherein each of the first optical switch and the second optical switch is a carrier-injected optical waveguide type optical switch.

7. A light signal switching apparatus which comprises a plurality of input ports to which an input light signal is input and a plurality of output ports which output an output light signal, wherein the light signal switching apparatus outputs the output light signal from a desired output port out of the plurality of output ports, comprising:
a splitting element which polarizes an input light signal fed from the input port into a first component comprising a first polarized light signal and a second component comprising a second polarized light signal, whose polarization planes are different mutually by 90 degrees, to output the first polarized light signal and the second polarized light signal;
a first polarization controlling element which rotates a polarization plane of the second polarized light signal by 90 degrees to output a third polarized light signal;
a first optical switch which switches a path of the first polarized light signal fed from the splitting element to the desired output port side, to output the first polarized light signal;
a second optical switch which switches a path of the third polarized light signal fed from the first polarization controlling element to the desired output port side, to output the third polarized light signal;
a second polarization controlling element which rotates a polarization plane of the third polarized light signal fed from the second optical switch by 90 degrees to output a fourth polarized light signal; and
a combiner which combines the first polarized light signals fed from the first optical switch with the fourth polarized light signal fed from the second polarization controlling element, to output a combined light signal to the desired output port,
wherein the first polarization controlling element is provided at every input port.

8. The light signal switching apparatus according to claim 7,
wherein the splitting element splits the input light signal into a TE light and a TM light.

9. The light signal switching apparatus according to claim 7,
wherein each of the first polarization controlling element and the second polarization controlling element is a λ/2 plate.

10. The light signal switching apparatus according to claim 7,
wherein the first optical switch and the second optical switch execute a switching of the path complementarily.

11. The light signal switching apparatus according to claim 10,
wherein the first optical switch and the second optical switch are formed on a same substrate.

12. The light signal switching apparatus according to claim 7,
wherein each of the first optical switch and the second optical switch is a carrier-injected optical waveguide type optical switch.

13. A light signal switching apparatus which comprises an input port to which an input light signal is input and a plurality of output ports which output an output light signal, wherein the light signal switching apparatus outputs the output light signal from a desired output port out of the plurality of output ports, comprising:
a splitting element which polarizes an input light signal fed from the input port into a first component comprising a first polarized light signal and a second component comprising a second polarized light signal, whose polarization planes are different mutually by 90 degrees, to output the first polarized light signal and the second polarized light signal;
a first polarization controlling element which rotates a polarization plane of the second polarized light signal by 90 degrees to output a third polarized light signal;
a first optical switch which switches a path of the first polarized light signal fed from the splitting element to the desired output port side, to output the first polarized light signal;
a second optical switch which switches a path of the third polarized light signal fed from the first polarization controlling element to the desired output port side, to output the third polarized light signal;
a second polarization controlling element which rotates a polarization plane of the first polarized light signal fed from the first optical switch by 90 degrees to output a fourth polarized light signal; and
a combiner which combines the third polarized light signal fed from the second optical switch with the fourth polarized light signal fed from the second polarization controlling element, to output a combined light signal to the desired output port,
wherein each of the first optical switch and the second optical switch is a carrier-injected optical waveguide type optical switch.

14. The light signal switching apparatus according to claim 13,
wherein the splitting element splits the input light signal into a TE light and a TM light.

15. The light signal switching apparatus according to claim 13,
wherein each of the first polarization controlling element and the second polarization controlling element is a λ/2 plate.

16. The light signal switching apparatus according to claim 13, wherein the first optical switch and the second optical switch execute a switching of the path complementarily.

17. The light signal switching apparatus according to claim 16,
wherein the first optical switch and the second optical switch are formed on a same substrate.

18. A light signal switching apparatus which comprises an input port to which an input light signal is input and a plurality of output ports which output an output light signal, wherein the light signal switching apparatus outputs the output light signal from a desired output port out of the plurality of output ports, comprising:
  a splitting element which polarizes an input light signal fed from the input port into a first component comprising a first polarized light signal and a second component comprising a second polarized light signal, whose polarization planes are different mutually by 90 degrees, to output the first polarized light signal and the second polarized light signal;
  a first polarization controlling element which rotates a polarization plane of the second polarized light signal by 90 degrees to output a third polarized light signal;
  a first optical switch which switches a path of the first polarized light signal fed from the splitting element to the desired output port side, to output the first polarized light signal;
  a second optical switch which switches a path of the third polarized light signal fed from the first polarization controlling element to the desired output port side, to output the third polarized light signal;
  a second polarization controlling element which rotates a polarization plane of the third polarized light signal fed from the second optical switch by 90 degrees to output a fourth polarized light signal; and
  a combiner which combines the first polarized light signals fed from the first optical switch with the fourth polarized light signal fed from the second polarization controlling element, to output a combined light signal to the desired output port,
wherein each of the first optical switch and the second optical switch is a carrier-injected optical waveguide type optical switch.

19. The light signal switching apparatus according to claim 18,
wherein the splitting element splits the input light signal into a TE light and a TM light.

20. The light signal switching apparatus according to claim 18,
wherein each of the first polarization controlling element and the second polarization controlling element is a $\lambda/2$ plate.

21. The light signal switching apparatus according to claim 18,
wherein the first optical switch and the second optical switch execute a switching of the path complementarily.

22. The light signal switching apparatus according to claim 21,
wherein the first optical switch and the second optical switch are formed on a same substrate.

* * * * *